Nov. 11, 1930.                                            1,781,287
E. J. LEVY, NOW BY JUDICIAL CHANGE OF NAME E. L. MAYO
THERMOSTAT
Filed May 26, 1927
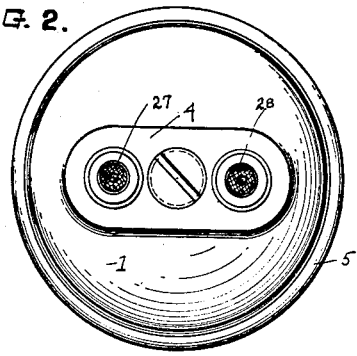
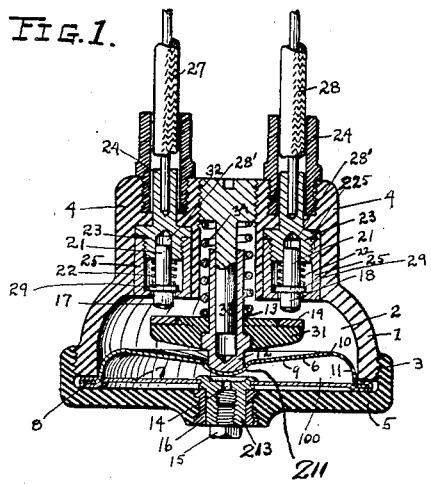
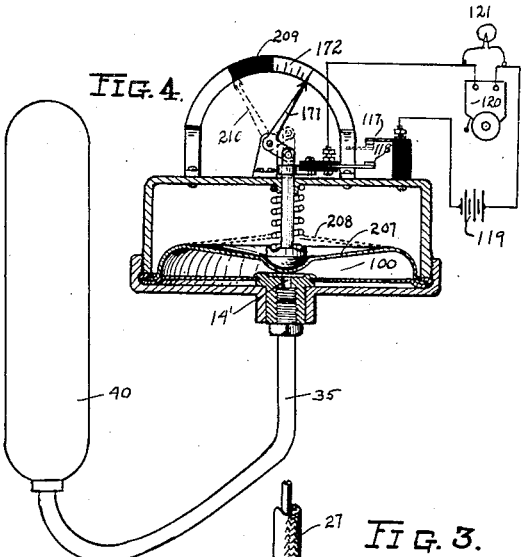
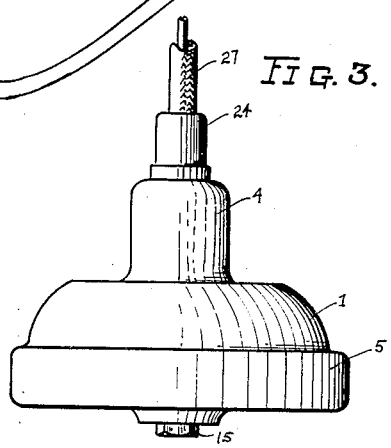
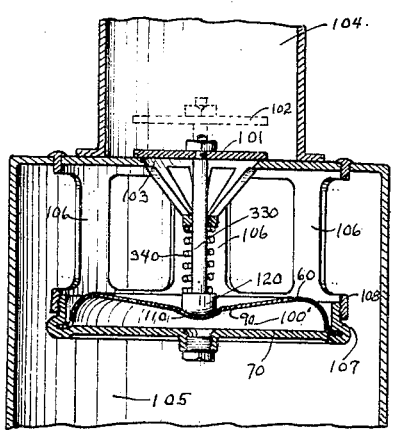
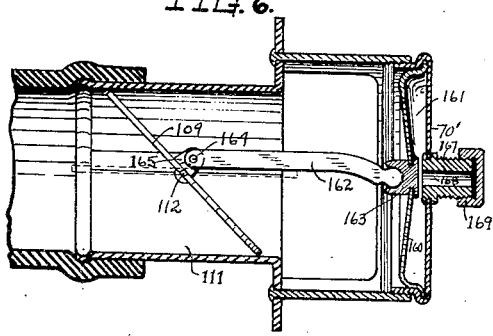
Edward J. Levy, Inventor
By Frank M. Slough
His Attorney Patented Nov. 11, 1930

1,781,287

UNITED STATES PATENT OFFICE

EDWARD J. LEVY (NOW BY JUDICIAL CHANGE OF NAME EDWARD LEVY MAYO), OF CLEVELAND, OHIO, ASSIGNOR TO THE BISHOP & BABCOCK MANUFACTURING COMPANY, OF CLEVELAND, OHIO, A CORPORATION OF OHIO

THERMOSTAT

Application filed May 26, 1927. Serial No. 194,275.

My invention relates to thermostats and relates particularly to thermostats of a type adaptable for use for operating electric switches, fluid controlling valves, and the like, responsive to a change in temperature of a fluid medium to which the thermostat is exposed.

My invention has for an object the positive operation of an actuated element after a predetermined temperature, to which the thermostat is exposed, is attained.

Another object of my invention is to accomplish a sudden actuation of a mechanism upon a predetermined temperature.

Another object of my invention is to accomplish a range of movement of an actuated part, gradually up to a predetermined temperature variation, and then if the predetermined change in temperature is materially exceeded, to accomplish a sudden rapid movement of an actuated part, whereby very desirable conditions of control may be had over an actuated mechanism responsive to temperature changes over a predetermined range.

Another object of my invention is to provide a thermostatic element adapted for the accurate actuation of controlling and/or indicating mechanism at predetermined temperatures.

Another object of my invention is to provide a thermostat of the "snap" action type, at a minimum cost, and which will be efficient in operation.

Another object of my invention is to provide a thermostat of the "snap" action type whose operative range of operating temperatures may be varied in a simple facile manner.

Another object of my invention is to provide a thermostat of the "snap" action type adapted for the actuation of an indicator, over a given temperature range, to indicate the temperature over such range, and which will accomplish a "snap" action after a predetermined temperature is reached, to actuate an alarm or other mechanism.

Another object of my invention is to provide a "snap" action thermostat adapted to indicate variations in temperature over a given temperature range, and to audibly operate when this temperature range is exceeded, accomplishing an audible alarm upon such excessive temperature conditions being attained.

The above and other objects of my invention will be better understood by reference to the following description of certain embodiments of my invention and which embodiments are illustrated in the accompanying drawings forming a part of this specification.

Referring to the drawings:

Fig. 1 illustrates in longitudinal, medial, sectional view, an embodiment of my invention comprising a thermostatically operated electric switch mechanism, Fig. 2 being a plan view and Fig. 3 a side elevational view of the same;

Figs. 4, 5 and 6 are views mostly in longitudinal medial section of other embodiments of my invention.

Referring now first more particularly to that embodiment of my invention illustrated in Figs. 1 and 3, at 1 I show a casing having a cup recess 2 embraced by side walls having exteriorly threaded peripheral portions 3 and an end wall 4, the end wall being preferably of substantial thickness, as shown, the casing being of substantially hard insulating material, such as bakelite, hard rubber, or the like, bakelite being preferred since its thermal coefficient of expansion is less than that of rubber. A cap 5, which may be of insulating material similar to the casing 1, is provided of generally cup-shaped form, having interiorly threaded side walls adapted to make screw-threaded clamping engagement with the threaded side walls of the casing 1 at 3.

At 6 and 7, I show a pair of metallic disks secured together at their peripheries in any suitable way, such as in the embodiment illustrated, by folding the peripheral portions of the element 7 over the edge of the peripheral flange 8 of the disk 6; one of the disks 7 is preferably planar, the other 6 being dished and having an end wall 9 re-entrant in its middle portion, the depth of the cup-shaped disk 6 being greatest in an annular portion 10 intermediate its side walls 11 and the central portion of the disk wherein a re-entrant depression 211 projects inwardly from the re-entrant end wall 9 to receive a rounded end 12 of a thrust rod 13. The center of the disk 7 is, in the embodiment illustrated, perforated to receive a nipple 213 rigidly clamped to the portions bordering the perforation, the nipple 213 being employed for the purpose of filling the interior chamber provided between the peripherally joined disks 6 and 7, and for other purposes later to be set forth, being provided with an axial passage 14.

A threaded plug 15 is provided, adapted to be screw-threaded into the outer end of the passage to close the same. The cap 5 is perforated at its center and the walls of the perforation are faced with a metallic bushing 16 molded with the cap and integrally, preferably by molding, joined therewith. The nipple 213 is pressed tightly within the bushing 16 and rigidly supports the central portion of the disk 7 which is rigidly supported at its periphery by clamping between the cap 5 and the rim of the casing 1.

An electric switch mechanism is provided, comprising a pair of switch contact elements 17 and 18, and an annular metallic switch element 19 adapted to be moved axially toward and away from the elements 17 and 18 to make and break an electrical switch comprising the said contact elements. Each of the contact elements 17 and 18 have radial flanges 29 and stems 21 of reduced section and are each spring-pressed to their normal positions, indicated in Fig. 1, by virtue of helical springs 22 interposed between the flanges 29 and threaded ends 23 of connector elements 24. Metallic retaining caps 25 are screw-threaded on to the threaded ends of the connector elements 24 against radial flanges 225 of the connectors, and the contact portions of the elements 17 and 18 project through central perforations in the caps 25 which engage the flanges 29 of the contact elements to retain them in normal advance positions, shown in Fig. 1, against the pressure of the springs 22. The caps 25 and connectors 23 are tightly pressed into recesses of suitable size provided in the end wall 4 of the casing, and the connectors 24 by reduced rearwardly extending portions project through openings 26 extending through the said end wall from the said recesses.

Tubular thimbles of bakelite, or other suitable preferably insulating material, are affixed by screw-threading to the casing end wall, being telescoped over the said reduced ends of the connectors to guard electric circuit conductors 27 and 28 telescoped into the thimbles and having their ends rigidly secured to the reduced ends 24 of the connectors to establish an electrical connection between the conductors and connectors, whereby an electrical circuit may be extended from the conductors to the respective contact elements 17 and 18 for each conductor.

By this arrangement, the contact elements are capable of yielding inwardly against the pressure of the springs 22 and are restrained from moving outwardly by their flanges 29 engaging the end walls of the caps 25, and are maintained in normal permanent spaced adjustment relative to the annular contact element 19, and, when contact is made with the said annular element, will yield inwardly to pressure exerted thereby and will make good electrical connection with the connectors 24 when at the end of their travel, current meanwhile being conveyed through the springs 22 and the lateral contacting walls of the stems 21 and recesses 28', which recess walls make guiding contact with the stems projected into the recesses, and which recesses are axially disposed in the threaded ends of the connectors.

The annular switch contact element 19 is molded into an annular block 31 of bakelite or like material through the center of which passes the thrust rod 13, and which is molded integral with the annular block 31.

The end wall 4 of the casing is bored centrally and the outer entrance to the bore is threaded at 32 to receive the externally threaded head of a rod having a reduced end 33 over which is telescoped the hollow thrust rod 13. A helical spring 34 is interposed between the enlarged threaded head of the rod and the block 31 to normally spring press the block which supports the contact element 19 toward the thermostatic element, the rounded end 12 of the thrust rod 13 being thereby spring pressed into the central partispherical re-entrant recess 11 in the thermostatic disk 10.

The thermostat element of my invention is adapted to be operated in either of two ways, one by the expansion or contraction of a fluid contained entirely in the chamber between the disks 6 and 7, this action being capable of being modified by the provision of a container 40 as indicated in the embodiment of my invention shown in Fig. 4 for the expansible fluid and which communicates through the port, as indicated at 14', Fig. 4, with the thermostatic cell 100. In the latter case the container 40 may be made with suitably thin thermally conducting walls whereby it will be made responsive to the changes in temperature of the medium in which it is placed, and upon an increase in temperature causing expansion of fluid within it, fluid pressure will be communicated by the conduit 35 from chamber 40 to the thermostatic cell 100. By assuming that the fluid pressure contained within the thermostatic cell 100, Fig. 1, may be varied in either of the two ways above mentioned, upon expansion of the fluid contained within the cell or the communication of fluid pressure to the cell from whatever source, the disk 7 being held against substantial change of form, the re-entrant end wall 9 of the disk 6 will receive an effort tending to press it outwardly to reverse its re-entrant form and to make it convex with respect to its exterior surface, thereby moving the thrust rod 13 axially on its guiding rod 33 against the pressure of the spring 34. The change of form from the re-entrant to the convex form of the central part 9 of the disk 6 will be accomplished suddenly, the action being that of a "snap" action and the return to the form illustrated in Fig. 5 will be likewise accomplished suddenly upon a change of temperature tending toward the original temperature.

The chamber provided between the peripherally joined disks 6 and 7 is adapted to receive a fluid through the port 14, communication therethrough being effected by first removing the plug 15 and then replacing it.

Upon axial movement of the thrust rod 13, the insulating block 31 will be moved, carrying the annular contact ring 19 to engagement with the contacts 17 and 18 which will be moved inwardly against the pressure of springs 22 and a good electrical connection will be effected between the circuit conductors 27 and 28 through the contacts 17 and 18 with the intermediate contact ring 19. The adjustment of the parts will preferably be such that when the disk 6 is momentarily in a form midway between its re-entrant and its convex forms, that the contact between the ring 19 and the contacts 17 and 18 will be just on the point of making or breaking, depending upon the direction of movement of the ring. This insures that the contacts will be made and broken when the ring 19 is moving most rapidly, the movement being extremely rapid at this point in its path.

Referring now to the other embodiments of my invention, in Fig. 5, I illustrate a thermostatic element comprising a relatively heavy disk 70 joined at its periphery by being folded over a concavo-convex disk 60 having a re-entrant centrally disposed portion 90 and in the center of which a ball recess 110 is provided to receive the round end 120 of a valve rod 330 adapted to communicate the "snap" movements of the center of the disk 60 to a poppet valve 101 which may be moved from its solid line normal closing position to its dotted line valve opening position 102, the valve port is shown at 103. The valve is adapted to control the flow of fluid from the conduit 104 through the valve port to the conduit 105, passages being provided between spaced arms 106 of a skeleton frame which supports the thermostatic element upon a wall of the conduit 105. An annular flange 107 making screw threaded engagement with a ring 108 is carried by the arms 106. This screw threaded connection is adapted to permit axial adjustment of the thermostatic element relative to the valve port 103, the function being performed similarly in the embodiment of Fig. 1 by the longitudinally adjustable rod 33. A spring 340 continually presses the valve rod into the ball recess of the disk 60.

In this embodiment of my invention, the expansible fluid contained in the chamber 100' of the thermostat element is adapted to "snap" the re-entrant portion 90 from its normal illustrated form to a form in which its outer surface is convex and in which the valve is moved to its position 102. Condensation or contraction of the fluid contained in the chamber will effect the opposite result and cause the closing of the valve, both movements being accomplished rapidly and positively, and responsive to the temperature of the fluid in the conduit 105 communicated to the thermostatic element.

Fig. 6 illustrates a similar arrangement by employing a butterfly valve 109 centrally pivoted in a conduit 111 at 112 and adapted to receive multiplied movements effected by a change of form of a re-entrant disk 160 of a thermostatic element 161 through a connecting rod 162, which makes a ball and socket joint with a button 163 carried at the center of the disk 160 and the butterfly valve. Connection with the butterfly valve is effected by means of a pivot pin 164 passing through the end of the rod 162 and through a bifurcated short arm 165 secured to the valve 109 near its pivot 112 but spaced therefrom. The butterfly valve is illustrated in valve closing position at an angle of about 45 degrees from the axis of the conduit 111 and is moved into alignment with such axis by longitudinal movements of the rod 162, the arm 165 being disposed approximately at right angles to the plane of the valve 109. A nipple 167 is affixed to the relatively heavy disk 70' of the thermostatic element and contains a passage 168 leading from the interior of the element, the passage being capable of being capped by a closure cap 169 and the nipple adapted, when desired, for attachment as through a conduit 35 with a fluid containing chamber 40, as in Fig. 4, or to be closed as illustrated.

In Fig. 4, I illustrate another embodiment of my invention similar to that of the embodiments of Figs. 5 and 6, but wherein a pivoted pointer 171 may be moved over a scale 172 to indicate axial movements of the center of the disk 207, the scale being graduated until the pointer has moved responsive to the gradual movement of the center of the disk 207 wherein it is snapped to its alternative dotted line position 208. The portion of the scale shaded black and indicated at 209 illustrates the movement of the pointer 171 toward its extreme position 210 corresponding to the dotted line position 208 of the element. In such an extreme position, the electrical contacts 117 and 118 will be closed to complete an electrical circuit comprising a source of current and an electric bell 120 and/or a signal lamp 121 to audibly and optically indicate the temperature at which the thermostatic element is moved to its alternative concavo-convex form.

Having thus described my invention in several embodiments, I am aware that numerous and extensive departures may be made from the embodiments herein illustrated and described and comprising changes in mechanisms adapted to be operated by my improved thermostatic element but without departing from the spirit of my invention.

I claim:

1. In a fluid pressure-operated switch mechanism a cell having a substantially rigid end wall and a disk of substantially saucer-form joined by its rim to the border of the said rigid wall, said saucer-form disk having a reentrant end wall joined to its rim by a gradually radially curvilinear annular portion, means to introduce a fluid under pressure between the walls of the cell, and an electrical switch operable by snapping movements of the reentrant portion of the disk end wall responsive to variations in fluid pressure between the walls, and spring means tending to restore the switch after an actuation effected by the expansive effect of fluid pressure in the chamber, said electrical switch comprising a plunger mounted for movement axially to the disk reentrant portion and having an end engageable therewith, said spring means comprising a spring disposed to press the plunger against said reentrant wall portion, an electrical switch blade supported on the plunger, and electrical contact means engageable by the switch blade upon a predetermined reciprocatory movement of the plunger responsive to a snap movement of the reentrant portion of the disk.

2. In a fluid pressure-operated switch mechanism a cell having a substantially rigid end wall and a disk of substantially saucer-form joined by its rim to the border of the said rigid wall, said saucer-form disk having a reentrant end wall joined to its rim by a gradually radially curvilinear annular portion, means to introduce a fluid under pressure between the walls of the cell, and an electrical switch operable by snapping movements of the reentrant portion of the disk end wall responsive to variations in fluid pressure between the walls, and spring means tending to restore the switch after an actuation effected by the expansive effect of fluid pressure in the chamber, said electrical switch comprising a plunger mounted for movement axially to the disk reentrant portion and having an end engageable therewith, said spring means comprising a spring disposed to press the plunger against said reentrant wall portion, an electrical switch blade supported on the plunger, and electrical contact means engageable by the switch blade upon a predetermined reciprocatory movement of the plunger responsive to a snap movement of the reentrant portion of the disk, a casing for supporting at one end the said cell, and at the other end the said contact means, and an adjustment screw, said adjustment screw being reciprocable axially of the plunger when turned in the casing, and said spring being disposed between a face of said screw and said plunger.

3. In a fluid pressure-operated switch mechanism a cell having a substantially rigid end wall and a disk of substantially saucer-form joined by its rim to the border of the said rigid wall, said saucer-form disk having a reentrant end wall joined to its rim by a gradually radially curvilinear annular portion, means to introduce a fluid under pressure between the walls of the cell, and an electrical switch operable by snapping movements of the reentrant portion of the disk end wall responsive to variations in fluid pressure between the walls, and spring means tending to restore the switch after an actuation effected by the expansive effect of fluid pressure in the chamber, said electrical switch comprising a plunger mounted for movement axially to the disk reentrant portion and having an end engageable therewith, said spring means comprising a spring disposed to press the plunger against said reentrant wall portion, an electrical switch blade supported on the plunger, and electrical contact means engageable by the switch blade upon a predetermined reciprocatory movement of the plunger responsive to a snap movement of the reentrant portion of the disk, said contact means comprising a contact holder, a contact supported for reciprocation in the holder, a spring normally urging the contact to one extreme position, a stop for limiting the movement of the contact beyond such position, said contact being adapted to be moved by movement of the switching blade with the plunger in a direction away from said stop, against the pressure of said spring.

4. In a fluid pressure-operated switch mechanism a cell having a substantially rigid end wall and a disk of substantially saucer-form joined by its rim to the border of the said rigid wall, said saucer-form disk having a reentrant end wall joined to its rim by a gradually radially curvilinear annular portion, means to introduce a fluid under pressure between the walls of the cell, and an electrical switch operable by snapping movements of the reentrant portion of the disk end wall responsive to variations in fluid pressure between the walls, and spring means tending to restore the switch after an actuation effected by the expansive effect of fluid pressure in the chamber, said electrical switch comprising a plunger mounted for movement axially to the disk reentrant portion and having an end engageable therewith, said spring means comprising a spring disposed to press the plunger against said reentrant wall portion, an electrical switch blade supported on the plunger, and electrical contact means engageable by the switch blade upon a predetermined reciprocatory movement of the plunger responsive to a snap movement of the reentrant portion of the disk, a casing for supporting at one end the said cell, and at the other end the said contact means, and an adjustment screw, said adjustment screw being reciprocable axially of the plunger when turned in the casing, said spring being disposed between a face of said screw and said plunger, said contact means comprising a pair of contacts disposed on opposite sides of the said plunger, said switch blade comprising an annulus encircling the plunger.

5. In a thermostatically operable electric switch mechanism, a thermostat element comprising a disk constrained against outward movement at its edges and having a central depression, a switch blade in the form of an annulus disposed at one side of the disk, plunger means supporting the switch blade engageable with the central portion of the disk, a casing supporting said plunger and guiding means for said plunger adapted to guide the same to limit movements of the same to axial movements, a compression spring adapted to continually press the plunger axially against the central portion of the disk, and a pair of contacts engageable with the blade on its side opposite from the disk upon movements of the blade effected by reciprocation of the plunger, and means operable upon temperature changes adapted to effect a snap action movement axially of the central portion of the disk to snap the blade into engagement with the contacts, said spring being adapted to subsequently restore the plunger and supported blade with the disk central portion upon a subsequent opposite change of temperature.

6. In a thermostatically operable electric switch mechanism, a thermostat element comprising a disk constrained against outward movement at its edges and having a central depression, a switch blade in the form of an annulus disposed at one side of the disk, plunger means supporting the switch blade engageable with the central portion of the disk, a casing supporting said plunger and guiding means for said plunger adapted to guide the same to limit movements of the same to axial movements, a compression spring adapted to continually press the plunger axially against the central portion of the disk, and a pair of contacts engageable with the blade on its side opposite from the disk upon movements of the blade effected by reciprocation of the plunger, means operable upon temperature changes adapted to effect a snap action movement axially of the central portion of the disk to snap the blade into engagement with the contacts, said spring being adapted to subsequently restore the plunger and supported blade with the disk central portion upon a subsequent opposite change of temperature, said blade being engageable with said contacts prior to the limit of movement of the blade, and yielding means associated with said blade and contacts adapted to permit continued movement of the plunger after engagement of the contacts.

7. In a thermostatically operable electric switch mechanism, a thermostat element comprising a disk constrained against outward movement at its edges and having a central depression, a switch blade in the form of an annulus disposed at one side of the disk, plunger means supporting the switch blade engageable with the central portion of the disk, a casing supporting said plunger and guiding means for said plunger adapted to guide the same to limit movements of the same to axial movements, a compression spring adapted to continually press the plunger axially against the central portion of the disk, and a pair of contacts engageable with the blade on its side opposite from the disk upon movements of the blade effected by reciprocation of the plunger, means operable upon temperature changes adapted to effect a snap action movement axially of the central portion of the disk to snap the blade into engagement with the contacts, said spring being adapted to subsequently restore the plunger and supported blade with the disk central portion upon a subsequent opposite change of temperature, said blade being engageable with said contacts prior to the limit of movement of the blade, and yielding means associated with said blade and contacts adapted to permit continued movement of the plunger after engagement of the contacts, a stop for each contact adapted to limit the movement of the contact in a direction toward the blade, said yielding means comprisng a compression spring for each of said contacts adapted to resiliently press the contact toward the stop.

In testimony whereof I hereunto affix my signature this 3rd day of May, 1927.

EDWARD J. LEVY,
*Now by Judicial Change of Name Edward Levy Mayo.*